US006291552B1

(12) United States Patent
Dong

(10) Patent No.: US 6,291,552 B1
(45) Date of Patent: Sep. 18, 2001

(54) METHOD FOR PRODUCING A GLASS MAT

(75) Inventor: Daojie Dong, Westerville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/431,340

(22) Filed: Oct. 29, 1999

(51) Int. Cl.$^7$ .................................................. C08K 9/00
(52) U.S. Cl. ......................... 523/217; 523/222; 524/492; 524/493; 524/494
(58) Field of Search .................................. 523/217, 222; 524/492, 493

(56) References Cited

U.S. PATENT DOCUMENTS

| | | |
|---|---|---|
| 4,225,383 | 9/1980 | McReynolds . |
| 4,258,098 | 3/1981 | Bondoc et al. ....................... 428/288 |
| 4,526,914 | 7/1985 | Dolin ..................... 524/42 |
| 4,680,223 | 7/1987 | Bither . |
| 4,681,658 | 7/1987 | Hsu et al. ............................ 162/156 |
| 4,869,932 | 9/1989 | Romberger ........................... 427/299 |
| 5,318,669 | 6/1994 | Dasgupta ........................... 162/164.3 |
| 5,407,536 | 4/1995 | Razac et al. ........................... 162/156 |
| 5,518,586 | 5/1996 | Mirous ................................. 162/156 |
| 5,977,232 | * 11/1999 | Arkens et al. ....................... 524/404 |

FOREIGN PATENT DOCUMENTS

| | | |
|---|---|---|
| WO 98/11299 | 3/1998 | (WO) . |
| WO 99/45198 | 9/1999 | (WO) . |

* cited by examiner

Primary Examiner—James J. Seidleck
Assistant Examiner—U. K. Rajguru
(74) Attorney, Agent, or Firm—Inger H. Eckert

(57) ABSTRACT

The invention relates to glass mats and their method of manufacture. In particular, the invention relates to a wet-laid method of making a glass mat and the mats formed by this method. The method includes combining a dispersant, water, glass fiber bundles, and a charged viscosity modifier to form a slurry, adding an oppositely charged viscosity modifier to the slurry, and removing the water from the slurry to form a wet glass mat. The present invention enables improved control of fiber dispersion and subsequent bundling of the fibers to form, for example, bundled glass mats with high porosity and a uniform weight. Mats produced by the present invention may be formed into a variety of products, such as in glass fiber paper, roofing shingles, and composite articles.

21 Claims, 3 Drawing Sheets

METHOD FOR PRODUCING A GLASS MAT

FIELD OF THE INVENTION

The invention relates to glass mats and their method of manufacture. In particular, the invention relates to a wet-aid method of making a glass mat, particularly abundled glass mat, and the mats formed by this method. Such mats may be formed into a variety of products, such as roofing shingles, composite articles, polyurethane foam headliners, and employed in reinforced plastics applications such as boat hulls and food service trays.

BACKGROUND OF THE INVENTION

Glass fiber mats are used as reinforcing elements for roofing shingles, flooring, and wall coverings, as well as in the formation of molded parts using polymer resins. The fiberglas s mat industry typically uses 1.25 inch fiberglass fibers to make mats. These fiberglass fibers are generally coated with a sizing agent, typically an antistatic compound, such as a cationic softener, and formed into mats.

The two most common methods for producing glass fiber mats from such fibers involves wet-aid and dried processing. Typically, in a dry-lid process, fibers are chopped and air blown onto a conveyor, and a binder is then applied to form a mat. Dry-laid processes may be particularly suitable for the production of highly porous mats having bundles of glass fibers. However, such dry-laid processes tend to produce mats that do not have a uniform weight throughout their surface areas. This is particularly true for lightweight dry-aid mats having a basis weight of 200 g/m$^2$ or less. In addition, the use of dry-chopped input fibers can be more expensive to process than those used in a wet-laid process, as the fibers in a dry-laid process are typically dried and packaged in separate steps before being chopped, which may not be necessary in wet-laid processes.

In a wet-laid process, an aqueous solution, often referred to in the art as "white water", is formed into which the glass fibers are dispersed. The white water may contain dispersants, viscosity modifiers, defoaming agents or other chemical agents. Chopped, fibers are then introduced into the white water and agitated such that the fibers become dispersed, forming a slurry. The fibers of the slurry may then be deposited onto a moving screen, whereupon a substantial portion of the water is removed-to form a web. A binder is then applied to the web and the resulting mat is dried to remove the remaining water and to cure the binder. The resulting non-woven mat is an assembly of dispersed glass filaments.

The white water and resulting slurry can play a major role in achieving the desired fiber distribution within the glass fiber mats. For example, the type and charge of the glass fibers, the dispersant, and/or the viscosity modifiers in the white water can affect the level of dispersion of the fibers. Further, the level of dispersion of the fibers during processing has a significant effect on the porosity, tensile strength and tear strength of the finished glass mat.

Wet-laid processes have employed nonionic viscosity modifier systems, which may contain a cationic viscosity modifier, or anionic viscosity modifier systems. For example, U.S. Pat. No. 4,869,932 proposes treating glass fibers with low molecular weight watersoluble anionic vinyl polymers for use in a white water having a long-chain anionic viscosity modifier, to prevent precipitates from interfering with the white water formulation. In contrast, U.S. Pat. No. 4,526,914 relates to a white water dispersant system employing a cationic surfactant, a viscosity modifier system having a cationic viscosity modifier and 0 to 90% of a nonionic cellulosic viscosity modifier.

Previous systems have not proven entirely satisfactory for controlling the dispersion of fibers and subsequent formation of glass mats with controlled porosity, particularly for bundled or structured glass mats. For example, wet-laid processes containing an anionic polyacrylamide viscosity modifier have been used to make mats with highly dispersed fibers, such as for roofing mats, but are not suitable for making bundled or structured glass mats.

Accordingly, there is a need for a wet-laid process for making glass mats which is economical and allows better control of fiber-fiber interactions. More particularly, there is a need for an improved wet-laid process for making bundled or structured glass fiber mats having a high porosity and a uniform weight.

SUMMARY OF THE INVENTION

The invention answers the need for an economical wet-laid method for producing high quality fibrous glass mats. The invention accomplishes this by providing control of both the dispersion of glass fibers and subsequent bundling of the fibers through the use of oppositely charged viscosity modifiers. By properly sequencing the addition of the oppositely charged viscosity modifiers, the glass fibers may be dispersed in the white water and then attracted together to form bundles. Electrostatic forces generated by the viscosity modifiers first disperse the glass fibers, then attract the fibers back together in a controlled manner, so that glass mats, particularly those with high porosity and uniform weight, may be produced more efficiently and with better control than previously done.

More specifically, the invention provides for a method of making a fibrous glass mat, preferably a bundled glass mat. The method involves forming a glass mat by first dispersing glass fibers in a white water that contains a dispersant and a charged viscosity modifier to form a slurry. An oppositely charged viscosity modifier may then be added to the slurry. The water may then removed from the slurry to form a glass mat. The mats of the invention may contain uniformly dispersed glass fibers or bundles of glass fibers, depending upon the desired end use.

The invention also relates to a slurry. Generally, a slurry of the invention contains glass fibers, a positively charged or cationic viscosity modifier, a negatively charged or anionic viscosity modifier, a surfactant, and water. Typically, the cationic viscosity modifier is present in an amount ranging from about 100 parts per million (ppm) to about 1000 ppm, or about 0.01 to about 0.1 weight percent of the slurry. The anionic viscosity modifier is present in an amount of about 1 to about 35 weight percent by weight of the cationic viscosity modifier, or about 0.0001 to about 0.035 weight percent of the slurry.

The invention is discussed in more detail below.

DETAILED DESCRIPTION AND PREFERRED EMBODIMENTS OF THE INVENTION

Figure 1:
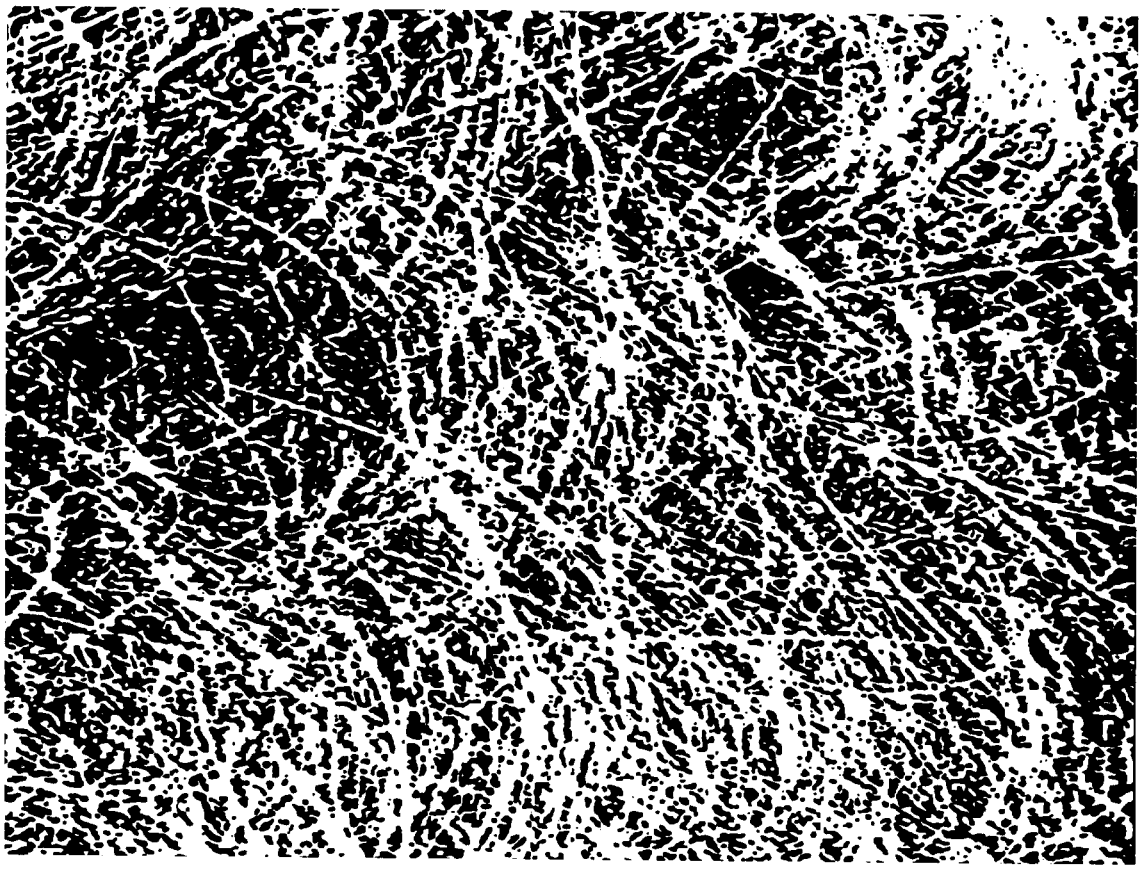
FIG. 1 is a photograph of a glass fiber mat manufactured in accordance with the invention using the conditions described in Example I.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

The present invention relates to a method of making a fibrous glass mat, as well as the mat produced. In an embodiment of the invention, a method of making a fibrous glass mat includes forming a slurry by combining a dispersant, water, glass fiber bundles, and a charged viscosity modifier, such as a positively charged or cationic viscosity modifier. The fibers disperse within the slurry to form a thick stock. An oppositely charged viscosity modifier, such as a negatively charged or anionic viscosity modifier, is then added to the slurry, allowing the charged and oppositely charged viscosity modifiers to come into contact with each other. The thick stock may be diluted with water to form a thin stock. To form a wet glass mat, water is removed from the slurry. Preferably, a binder is then applied to the wet mat, and excess moisture is removed and the binder is cured. This method is particularly suitable for making bundled or structured glass mats, which have a porous structure and a uniform distribution of fiber bundles across the mat.

The inventive method utilizes oppositely charged viscosity modifiers not only to modify the viscosity of the white water but also to control the amount of fiber dispersion and subsequent bundling of the fibers to form, for example, a bundled glass fiber mat. Control of electrostatic forces generated by the viscosity modifiers enables dispersion of the glass fibers in a white water and subsequent attraction of the fibers to form glass mats, particularly, bundled or structured glass mats. The resulting glass fiber mats produced by this method may comprise small or large bundles of fibers with a highly porous structure and a uniform distribution of the fiber bundles across the mat, resulting in a uniform fiber weight across the mat. In addition, the wet-laid method of the invention is more economical to use tam the typical dry-laid processes.

Glass Fibers

The type of glass fibers which may be introduced into the white water of the present invention is not particularly limited. For example, the glass fibers may be introduced into the white water in bundles, each bundle containing a plurality of glass fibers or filaments. Further, the number of filaments per bundle may be selected to optimize the dispersion of the fiber bundles in the white water. For example, the bundles may contain between about 1,000 to about 10,000 individual glass filaments, preferably about 4,000 to about 6,000 glass filaments, more preferably about 5,000 glass filaments.

The length and diameter of the individual glass fibers or filaments may be selected to maximize dispersion in the white water and, in a preferred embodiment of the invention, to optimize subsequent bundling of the fibers to form a bundled glass mat. For example, the individual glass filaments may have a fiber length of about 3 to about 50 millimeters, preferably about 18 millimeters to about 25 millimeters. Suitable diameters for the glass fibers include, but are not limited to, about 5 to about 25 microns, preferably about 10 to 20 microns, and most preferably about 16 microns.

It is preferred that prior to addition to the white water, the glass fibers have been treated with a sizing agent or sizing composition. A suitable sizing composition provides protection to glass fibers from interfilament abrasion during production of the fibers, for example, from molten glass. Any of a wide variety of sizing agents may be used, so long as they are compatible with the other components of the white water. An example of a sized glass fiber which is suitable for the present invention is commercially available under the trade designation 786A from Owens Corning, Toledo, Ohio.

The amount of fibers or fiber bundles in the white water is not particularly limited, so long as the fibers are capable of being dispersed in the white water and form a mat upon removal of the water. For example, when dispersed in a thick stock, the slurry may have a fiber consistency of about 0.3 to about 1.2 weight percent, preferably, about 1 weight percent. When diluted to form a thin stock, the slurry may have a fiber consistency of about 0.01 to about 0.08 weight percent, preferably about 0.03 weight percent.

Dispersants

To aid the dispersion of the glass fibers, a dispersant is typically added to the white water. Suitable dispersants include those which can effectively disperse the fibers of the glass fiber bundles in the white water without adversely reacting with any of the other components of the white water. The dispersant aids in breaking up the fiber bundles and dispersing the filaments.

Preferably, the dispersant is a surfactant. Suitable surfactants for the invention include, but are not limited to, nonionic, cationic and amphoteric surfactants. For example, cationic surfactants suitable for use in the invention include, but are not limited to, ethoxylated amines such as those commercially available from Rhone Poulenc, Cranbury, N.J. under the trade designation Rhodameen VP-532 SPB, and surfactants commercially available under the trade designations Shercopol DS-140 and DS-140 NF from Scher Chemicals, Inc., Clifton, N.J. Illustratively, amphoteric surfactants suitable for use in the present invention include, but are not limited to, cocamidopropyl hydroxysultaines such as those commercially available from Rhone Poulenc under the trade designation Mirataine CBS. Other suitable surfactants are commercially available from Nalco Chemical Company, Naperville, Ill.

Preferred dispersants for the present invention include ethoxylated amines and amphoteric cocamidopropyl hydroxysultaines. The most preferred ethoxylated amines and cocamidopropyl hydroxysultaines are Rhodameen VP-532-SPB, and Mirataine CBS, respectively.

The dispersant may be present in any effective amount to disperse the glass fibers in the white water. Preferably, the dispersant is present in the thin stock in the amount of about 30 to about 250 ppm, or about 0.003 to about 0.025 weight percent of the thin stock, more preferably about 120 ppm to about 180 ppm, or about 0.012 to about 0.018 weight percent of the thin stock.

Viscosity Modifiers

The viscosity modifiers that may be used in the present invention are not particularly limited. Any viscosity modifier with suitable charge characteristics may be used. For example, viscosity modifiers available under the trade designations Hyperfloc CP 905L, Hyperfloc CE193, Hyperfloc AE847, and Hyperfloc AF307, all commercially available from Hychem, Inc., Tampa, Fla.; Superfioc MX60, Magnifloc 1885A, and Superfloc A1885, commercially available from Cytec Industries, West Paterson, N.J.; and Jayfloc 3455L and Jayfloc 3462, commercially available from Callaway Chemical Company, Columbus, Ga., are suitable for use in the present invention. Preferably, the viscosity modifiers employed in the present invention are polymeric materials.

When polymeric viscosity modifiers are used in the present invention, the molecular weight of the polymers is not particularly limited, so long as the desired viscosity is obtained, usually, about 1.5 to about 4 centipoise for the thin stock. Generally, the weight average molecular weight of the viscosity modifiers may be about 500,000 or higher, preferably greater than about 10,000,000.

In a preferred embodiment of the invention, both cationic and anionic viscosity modifiers are utilized. Preferably, the cationic viscosity modifier is a cationic polyacrylamide, made by reacting a polyacrylamide with formaldehyde and a secondary amine, such as dimethylamide, in an aqueous solution to form a positively charged tertiary amine. Preferably, the anionic viscosity modifier is an anionic polyacrylamide, more particularly, a hydrolyzed copolymer containing acrylamide and acrylate groups. Most preferably, the anionic polyacrylamide used is Jayfloc 3455L, and the cationic polyacrylamide used is Jayfloc 3462, both available from Callaway Chemical Company, Columbus, Ga.

The amount of cationic and anionic viscosity modifier added to the white water may depend on the degree of dispersion of fibers desired and the amount of subsequent bundling of the fibers desired. For example, the cationic viscosity modifier may be present in the thin stock in the amount of about 100 to about 1000 ppm, or about 0.01 to about 0.1 weight percent of the thin stock, preferably, about 400 to about 600 ppm, or about 0.04 to about 0.06 weight percent. The anionic viscosity modifier may be present in the thin stock in the amount of about 1 ppm to about 350 ppm, or about 0.0001 to about 0.035 weight percent of the thin stock. Illustratively, the anionic viscosity modifier may be present in the thin stock in any range between about 1 ppm and about 350 ppm. Preferably, the anionic viscosity modifier is present in the thin stock in the amount of about 1 weight percent to about 35 weight percent by weight of the cationic viscosity modifier. For example, a preferred amount of anionic viscosity modifier in the thin stock may be between about 4 ppm and about 210 ppm; illustratively, between about 20 ppm and 30 ppm.

The viscosity modifiers utilized in the invention may be in solid or liquid form. For example, the viscosity modifiers may be in the form of a powder or in the form of an aqueous solution.

Other White Water Components

Other conventional additives may be added to the white water of the invention. For example, a biocide that is compatible with the white water may be added to reduce or eliminate organisms from contaminating or otherwise adversely affecting the production of glass fiber mats of the invention. Also, a defoamer that is compatible with white water may be used to decrease the level of air entrained in the white water that may result during processing. Suitable defoamers include, but are not limited to, Nalco 71-D5 Plus, commercially available from Nalco, Naperville, Ill., and Foam Master-NXZ, commercially available from Henkel Corporation. Preferably, a biocide and a defoamer is utilized in the present invention.

Preferred Methods of Glass Mat Formation

In an embodiment of the invention, a fibrous glass mat may be made by first combining a dispersant, water, glass fiber bundles, and a charged viscosity modifier to form a slurry. The order of addition of these components is not particularly limited. However, while the order of addition of the components may vary, it is preferred that a white water be formed by first adding the dispersant and a charged viscosity modifier to water. The glass fibers are then added to the white water to form a slurry.

The charged viscosity modifier may be added to the white water in the form of a powder under vigorous agitation. However, it is preferred that the charged viscosity modifier is added as an aqueous solution by, for example, vigorously agitating a powdered viscosity modifier in water until the powder is dissolved.

When combining the dispersant, water, glass fiber bundles, and the charged viscosity modifier, the slurry is preferably agitated to ensure proper mixing and dispersion of the fibers. For example, the water may be agitated while the dispersant is added, in order to uniformly disperse the dispersant in the solution. Also, the water containing the dispersant may be agitated while the charged viscosity modifier is added. Further, the white water containing the dispersant and the charged viscosity modifier may be agitated while the glass fiber bundles are added. The amount of time and intensity of agitation is not critical, so long as the components of the white water and/or slurry are, if necessary, agitated for a sufficient period of time and intensity to uniformly disperse the components, including the fibers from the fiber bundles. Preferably, after the glass fiber bundles are added, the slurry is agitated for a period of about 10 to about 60 minutes in order to break up the fiber glass bundles and disperse the individual fibers into the white water. However, it should be understood that the amount of time necessary will vary with the intensity of the agitation.

After dispersing the glass fibers in the slurry, an oppositely charged viscosity modifier may be added. By "oppositely charged" it is meant that the charge on the viscosity modifier is the opposite to that of the charged viscosity modifier added in the previous step. For example, if the charged viscosity modifier initially added to the white water is anionic, then a cationic viscosity modifier is added to the slurry containing the dispersed fibers. In a preferred embodiment, the charged viscosity modifier initially added to the white water is cationic, and the oppositely charged viscosity modifier added to the dispersed slurry is anionic. In an even more preferred embodiment, the charged viscosity modifier is a cationic polyacrylamide, and the oppositely charged viscosity modifier is an anionic polyacrylamide.

As with the charged viscosity modifier, the oppositely charged viscosity modifier may be added to the slurry in the form of a powder. However, it is preferred to add the oppositely charged viscosity modifier in the form of an aqueous solution, which minimizes the likelihood of any precipitates forming from the interaction of the charged and oppositely charged viscosity modifiers. Also, the slurry is preferably agitated during addition of the oppositely charged viscosity modifier.

By combining water, glass fibers, dispersant, and the charged and oppositely charged viscosity modifiers, a preferred slurry of the invention is formed. Illustratively, a cationic viscosity modifier may be present in the slurry in an amount ranging from about 0.01 to about 0.1 weight percent and the anionic viscosity modifier may be present in an amount ranging from about 1 to about 35 percent by weight of the cationic viscosity modifier.

The pH of the slurry, although not particularly limited, ranges from about 5 to about 10, more preferably, from about 7 to about 8.5. The viscosity of the slurry may be in the range from about 1 to about 6 centipoise, preferably about 1.5 to about 4 centipoise, for the thin stock. The preferred temperature range of the slurry is about 10 to 40° C.

After forming the slurry, the glass fiber mat may be formed. For example, the slurry may be diluted with water to form a thin stock. The thin stock may be passed through a screen or cylinder wherein the glass fibers are deposited. Water may be removed by gravity and/or suction, and a wet glass fiber mat is formed.

A binder may be applied to the wet glass mat in any suitable manner, such as, for example, a flood and extract method. Any binder capable of binding the fibers to form a glass mat of the invention can be used. Furthermore, the amount of binder can be varied such that the desired mat is formed. For example, the binder may be a urea-formaldehyde resin with a styrene-butadiene latex copolymer, and can furher include an acrylamide monomer such as acrylamide, methacrylamide, and N-methylolacrylamide.

Any excess moisture may be removed from the mat and the binder cured by conventional means known in the art. For example, the binder composition may be cured by heating the binder composition to an elevated temperature, typically at least 200° C., although a temperature below 200° C. could be employed. Although curing via heat treatment alone is usually sufficient to effect curing, a catalyst such as ammonium chloride, p-toluene, sulfonic acid, aluminum sulfate, ammonium phosphate, or zinc nitrate may be used to improve the rate of curing and the quality of the cured binder.

Mats of the Invention

Glass fiber mats having a wide range of properties may be produced by the invention. For example, highly dispersed fiber mats with lower open surface area, mats with smaller bundles, and/or mats with large bundles and more open surface area may be produced in accordance with the present invention. Illustratively, mats comprising highly dispersed fibers may be produced by limiting the amount of oppositely charged viscosity modifier used and/or limiting the contact time of the charged and oppositely charged viscosity modifiers prior to removing the water and curing the binder. Similarly, mats comprising larger bundles may be produced by increasing the amount of oppositely charged viscosity modifier used and/or increasing the contact time of the charged and oppositely charged viscosity modifiers prior to removing the water and applying and curing the binder. These bundled mats, i.e. structured glass mats, generally have a porous structure and a uniform distribution of fiber bundles.

The glass fiber mats of the present invention may be made using conventional equipment in a batch, semi-batch, or a continuous process. For example, in a small batch scale process, the dispersant, charged viscosity modifier, and glass fiber bundles may be combined in a deckle box to disperse the glass fibers, and the oppositely charged viscosity modifier may be added. The water may be drained from the deckle box and the fibers may be caught on the top of the screen of the deckle box. The wet glass mat may be dried and cured with a suitable binder to form a hand sheet.

For a commercial scale process, the wet-laid mats of the present invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A glass fiber mat of the present invention can be prepared by forming a white water by combining a dispersant and a charged viscosity modifier, e.g., a cationic viscosity modifier, with water in a mixing tank. The amount of water used in the process may vary depending upon the size of the equipment used. Typical volumes of water range from about 300,000 liters to about 1,850,000 liters. As mentioned above, other components such as defoamer and/or biocide may be added to the white water. Wet chopped fibers may be added to the white water and agitated to form a thick stock. The fiber consistency of the thick stock may be in the amount of about 0.3% to about 2.0% by weight, preferably about 1.2% by weight, even more preferably about 1% by weight. The thick stock may be delivered through a series of mixing and storage tanks and may be mixed with an oppositely charged viscosity modifier. The thick stock may be delivered into a silo where the glass fiber concentration is diluted to a consistency of about 0.01 to about 0.08% by weight, preferably about 0.03% by weight. The diluted or thin stock may be passed into a conventional head box where it is dewatered and deposited onto a moving wire screen where it is dewatered by suction or vacuum to form a non-woven glass fiber web. The web can then be coated with a binder by conventional means, e.g., by a flood and extract method and passed through a drying oven which dries the mat and cures the binder. The resulting mat may be collected in a large roll.

In an embodiment of the invention, a mat comprising bundles of fibers may be used in a number of different applications. For example, the mat may be used in composite articles and plastics. Also, the wet-laid mats may also be used in the production of boat hulls or food service trays. By the sequential addition of oppositely charged viscosity modifiers, the dispersion of the fiber bundles and the subsequent bundling of the dispersed fibers may be controlled through electrostatic interaction. Bundled mats with high porosity and uniform weight across the mat may efficiently and reliably produced using the present invention.

The foregoing detailed description has been given for clearness of understanding only and no unnecessary limitations should be understood therefrom as modifications will be obvious to those skilled in the art.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

EXAMPLES

Example I

A laboratory process was carried out to form a glass mat hand sheet exhibiting the desired fiber coarseness and mat density by the following process. First a 0.25 wt. % aqueous solution of cationic polyacrylamide "Jayfloc 3462" and a 0.25 wt. % aqueous solution of anionic polyacrylamide "Jayfloc 3455L" were prepared, respectively. To make a hand sheet, five drops of ethoxylated amine dispersant, available under the trade name "Rhodameen VP-532/SPB," Rhone Poulenc, Cranbury, N.J., was added to 5 liters of water under agitation, followed by 8.5 grams of wet chopped bundles of glass fibers having a length of 25 mm (1 inch) and a diameter of 16 microns. Then, 70 mL of 0.25 wt.% cationic polyacrylamide solution was added under vigorous agitation to form a thick stock. The thick stock was agitated for about 1 minute. In the meantime, another 70 mL of 0.25 wt.% cationic polyacrylamide solution and 2 mL of 0.25 wt.% anionic polyacrylamide solution were mixed into 35 liters of water in the second container equipped with a filtration wire mesh.

Once the glass fibers were dispersed, the 5 liter thick stock was transferred and mixed into the second container, and the dilute solution was vigorously agitated for about 5 to 8 seconds. Then, the water was drained and a wet glass mat was formed on the wire mesh. Excess water of this wet glass mat was removed by applying vacuum suction. Then, a urea-formaldehyde binder, previously prepared by combining urea-formaldehyde available from Borden Inc., Columbus, Ohio and styrene-butadiene latex obtained from Dow Chemical, Midland, Mich., was applied to the wet glass web. The excess binder was removed by applying vacuum suction, and the wet glass mat was dried and cured in an oven for about 15 minutes at a temperature of about 176° C. A section of the resultant dry glass mat is shown in FIG. 1.

Example II

Figure 2:
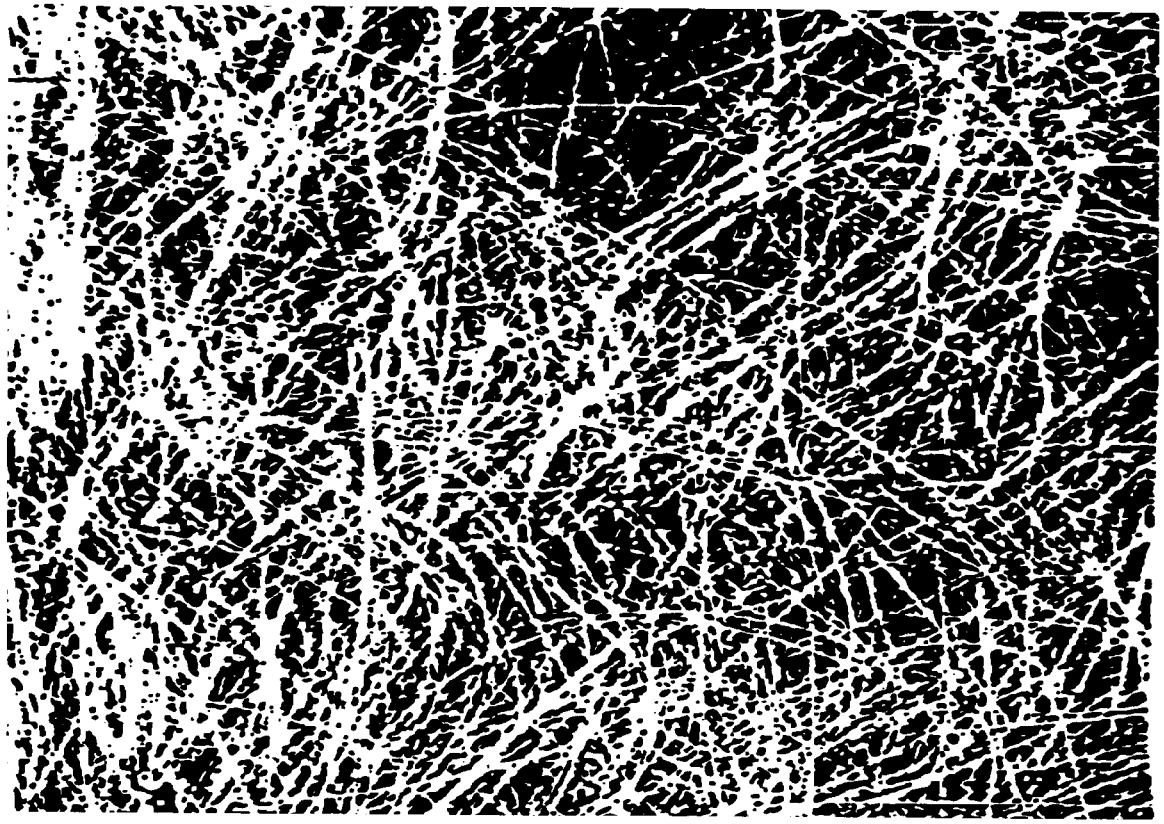
FIG. 2 is a photograph of a glass fiber m at manufactured in accordance with the invention using the conditions described in Example II.

The experimental procedure as described in Example I was carried out except that 7 mL of anionic polyacrylamide and 70 mL of cationic polyacrylamide were used to form the second aqueous solution. The remaining experimental steps were identical to those described in Example I. A section of the resultant dry glass mat is shown in FIG. 2.

Example III

Figure 3:
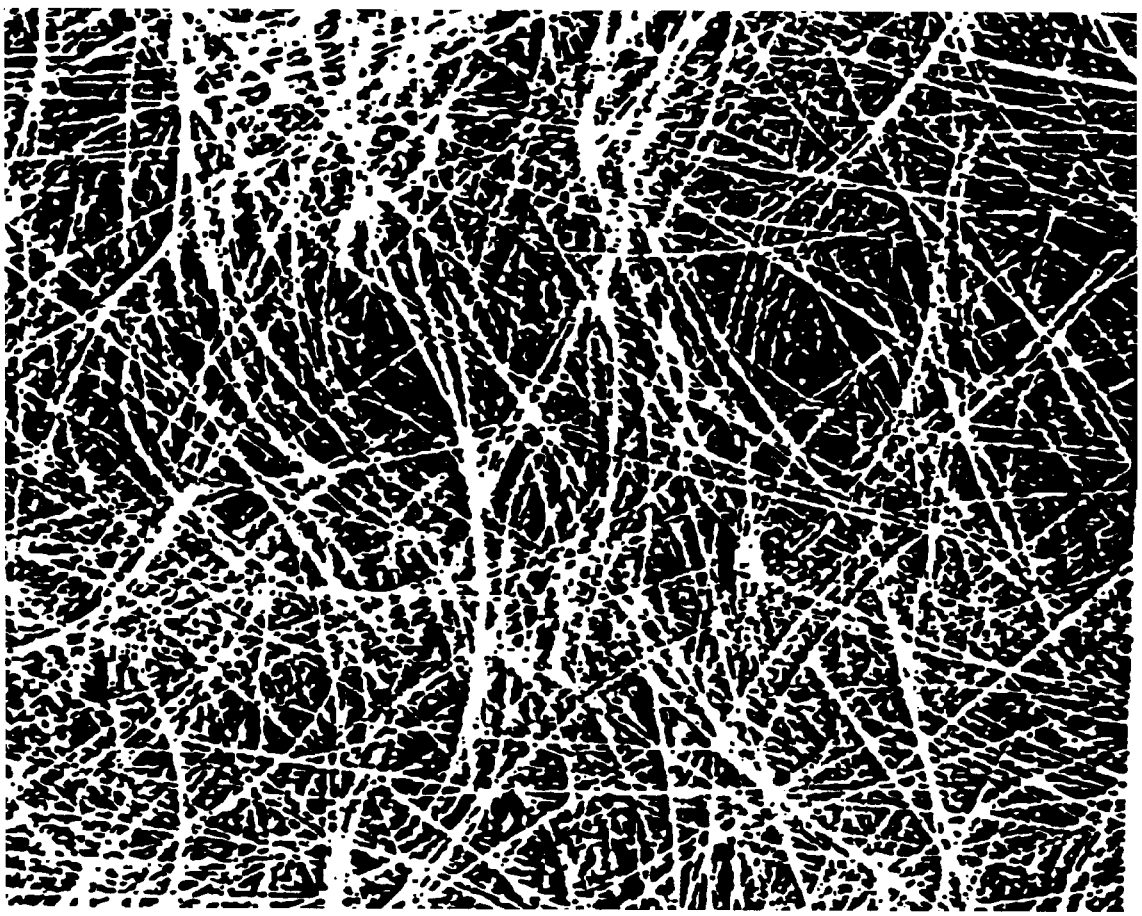
FIG. 3 is a photograph of a glass fiber mat manufactured in accordance with the invention using the conditions described in Example III.

The experimental process described in Example II was carried out with the exception that the dilute glass fiber slurry in the second container was agitated for 60 seconds. A section of the resultant dry glass mat is shown in FIG. 3.

What is claimed is:

1. A method of making a bundled or structured glass mat comprising the steps of:
   (a) forming a slurry of glass fibers, a dispersant, water, and at least one charged viscosity modifier;
   (b) subsequently adding at least one oppositely charged viscosity modifier to the slurry; and,
   (c) removing the water from the slurry to form a wet glass mat containing glass bundles.

2. The method of claim 1, further comprising the steps of:
   (d) applying a binder to the wet glass mat; and,
   (e) curing the binder.

3. The method of claim 1, wherein the charged viscosity modifier in step (a) is a cationic viscosity modifier and the oppositely charged viscosity modifier in step (b) is an anionic viscosity modifier.

4. The method of claim 3, wherein the cationic viscosity modifier is a cationic polyacrylamide and the anionic viscosity modifier is an anionic polyacrylamide.

5. The method of claim 1, wherein the oppositely charged viscosity modifier of step (b) is added to the slurry of step (a) in the form of an aqueous solution.

6. The method of claim 5, wherein the aqueous solution, in addition to the oppositely charged viscosity modifier, further comprises at least one charged viscosity modifier.

7. The method of claim 1, wherein the charged viscosity modifier is present in an amount ranging from about 0.01 to about 0.1 weight percent of the slurry and the oppositely charged viscosity modifier is present in an amount ranging from about 1 to about 35 weight percent by weight of the charged viscosity modifier.

8. The method of claim 1, wherein slurry step (a) comprises the steps of:
   (i) forming a white water comprising water, a dispersant, and a charged viscosity modifier and
   (ii) adding glass bundles to the white water.

9. The method of claim 1, wherein the slurried glass fibers have an average fiber length of about 3 to about 50 mm.

10. The method of claim 1, wherein the glass fibers added to form the slurry are in the form of glass bundles having from about 1,000 to about 10,000 individual glass filaments.

11. The method of claim 1, wherein the dispersant is a surfactant.

12. The method of claim 11, wherein the surfactant is selected from the group consisting of nonionic, cationic, amphoteric surfactants and mixtures thereof.

13. The method of claim 11, wherein the surfactant is an ethoxylated amine, cocamidopropyl hydroxysultaine or a mixture thereof.

14. A bundled glass mat formed by the method of claim 1.

15. A method of making a fibrous glass mat comprising the steps of:
   (a) foig a slurry of glass fibers, a dispersant, water, and at least one charged viscosity modifier;
   (b) subsequently adding an oppositely charged viscosity modifier to the slurry; and
   (c) removing the water from the slurry to form a wet glass mat.

16. The method of claim 15, further comprising the steps of:
   (d) applying a binder to the wet mat; and,
   (e) removing any excess moisture and curing the binder.

17. The method of claim 15, wherein the charged viscosity modifier is present in an amount ranging from about 0.01 to about 0.1 weight percent of the slurry, and the oppositely charged viscosity modifier is present in an amount ranging from about 1 to about 35 weight percent by weight of the charged viscosity modifier.

18. The method of claim 15, wherein the dispersant comprises an ethoxylated amine or a cocoamidopropyl hydroxysultaine.

19. The method of claim 15, wherein the charged viscosity modifier comprises cationic polyacrylamide and the oppositely charged viscosity modifier comprises anionic polyacrylamide.

20. A slurry comprising:
   (a) glass fibers having an average fiber length of about 3 to about 50 mm;
   (b) a cationic viscosity modifier in an amount ranging from about 0.01 to about 0.1 weight percent of the slurry;
   (c) an anionic viscosity modifier in an amount ranging from about 1 to about 35 weight percent by weight of the cationic viscosity modifier;
   (d) a surfactant; and
   (e) water.

21. The slurry of claim 20, wherein the cationic viscosity modifier is a cationic polyacrylamide and the anionic viscosity modifier is an anionic polyacrylamide.

* * * * *

UNITED STATES PATENT AND TRADEMARK OFFICE
CERTIFICATE OF CORRECTION

PATENT NO.    : 6,291,552 B1
DATED         : September 18, 2001
INVENTOR(S)   : Dong Page 1 of 1

It is certified that error appears in the above-identified patent and that said Letters Patent is hereby corrected as shown below:

Column 10,
Line 23, should read:
(a) forming a slurry of glass fibers, a dispersant, water, and at Signed and Sealed this Fifth Day of March, 2002

*Attest:*

*Attesting Officer*

JAMES E. ROGAN
*Director of the United States Patent and Trademark Office*